United States Patent Office 3,677,809
Patented July 18, 1972

3,677,809
PROCESS FOR THE COATING OF FILAMENT BODIES WITH AN ADHESIVE FOR METAL AND RUBBER
Günter Klement, Dusseldorf-Holthausen, Germany, assignor to Henkel & Cie GmbH, Dusseldorf, Germany
No Drawing. Filed Nov. 12, 1969, Ser. No. 876,085
Claims priority, application Germany, Nov. 28, 1968, P 18 11 467.5
Int. Cl. B44d 1/42, 1/48; C03c 25/02
U.S. Cl. 117—119.6
8 Claims

ABSTRACT OF THE DISCLOSURE

A process for the coating of filament bodies with organic adhesives for metal and rubber which consists essentially of the steps of applying a coating of an organic adhesive for metal and rubber in dissolved or dispersed form in an organic solvent to a filament body of small diameter, passing said coated filament body through a heated zone having a temperature of from 225° to 500° C. for a period of from 1 to 60 seconds, and recovering said coated filament body adapted to bond to elastomer stock mixtures.

THE PRIOR ART

While organic adhesive agents are used with good results as binders for rubber to metal in the production of rubber-metal-formed parts, and the formerly used "brass-binders" which use adhesive agent, a mostly galvanically precipitated brass layer of a certain composition, have been displaced to a large extent, brass-coated steel wire and steel cord are still being used for the binding of rubber to filament bodies. For example, brass-coated steel wire and steel cord are utilized in the manufacture of maximum pressure hoses or for tires reinforced by steel cords. The rubber or elastomer stock must be specifically adjusted in order to obtain a good adhesion of rubber to brass. This is the more difficult the higher the demands for rubber are with respect to temperature and aging durability. In practice insufficient adhesion is obtained by vulcanization of rubber stock mixtures, based on nitrile rubber or ethylene-propylene-terpolymer rubber, on brass-plated steel surfaces. As adhesive agent, instead of brass, bronze or copper may be used. However, also here the same problem arise as with the brass method.

An additional method uses preferably galvanized steel wires or cords for the binding of special rubber stock mixtures, so called adhesive mixtures, which mostly contain cobalt compounds, such as cobalt naphthenate. A practical disadvantage to this operation is the fact that the bond is sensitive to "overheating," prolonged heating in the vulcanization press.

Finally, it is known that by the addition of resin forming substances, such as resorcinol and compounds splitting off formaldehyde, such as hexamethylenetetramine, as well as of acidic fillers, such as silica gel to unvulcanized rubber mixtures, so-called adhesive mixtures may be obtained which give improved adhesion to textile fabrics and brass-coated steel wires or cords.

However, this method also requires the preparation of specially formulated rubber stock mixtures, whereby it must be considered that the adhesive compounds present alter the properties of the raw stock mixtures and of the vulcanizates.

Thus, attempts were not lacking to coat filament bodies, such as steel wire or steel strands with organic adhesive agents. However, various demands must be made for the properties of such a coated filament body if it should be satisfactory.

Adhesives for rubber and metal consist mainly of solutions of organic polymers and of dispersed solid compounds in organic solvents. They form, in general, hard and relatively brittle films after drying. However, high flexibility is demanded for the coating of filament bodies in order to avoid chipping off of the coating while the filament bodies are being worked on. If adhesives are chosen which yield a softer, more elastic film, coating of too low a cohesion and therewith too low wear-resistance are obtained. For instance, such a coated wire loses prematurely the adhesive film while being on the processing machines for the preparation of wire-reinforced rubber articles through the shearing stresses which occur thereon.

OBJECTS OF THE INVENTION

An object of the present invention is the development of a process for coating filament bodies with an adhesive for metal and rubber which have a firm bond between the adhesive and the base material and, in addition, the adhesive layer is present in a reactive and flexible form.

Another object of the present invention is the development of a process for the coating of filament bodies with organic adhesives for metal and rubber which consists essentially of the steps of applying a coating of an organic adhesive for metal and rubber in dissolved or dispersed form in an organic solvent to a filament body of small diameter, passing said coated filament body through a heated zone having a temperature of from 225° to 500° C. for a period of from 1 to 60 seconds, and recovering said coated filament body adapted to bond to elastomer stock mixtures.

These and other objects of the present invention will become more apparent as the description thereof proceeds.

DESCRIPTION OF THE INVENTION

The drawbacks of the prior art have been overcome and the objects of the invention have been achieved by a process for the coating of filament bodies with organic adhesives for metal and rubber which consists essentially of the steps of applying a coating of an organic adhesive for metal and rubber in dissolved or dispersed form in an organic solvent to a filament body of small diameter, passing said coated filament body through a heated zone having a temperature of from 225° to 500° C., preferably 250° to 400° C., for a period of from 1 to 60 seconds, preferably 2 to 20 seconds, and recovering said coated filament body adapted to bond to elastomer stock mixtures.

"Filament bodies" refer to all types of wires, strands, cords, ropes, cables of drawn, twisted or woven construction, preferably of a diameter of from about 0.1 mm. to 25 mm., particularly of a diameter of from 0.15 mm. to 10 mm. Preferably, the filament bodies are inorganic in nature, but organic filament bodies may also be utilized in the process of the invention.

The organic adhesives to be applied to the filament bodies in the process of the invention for the adhesion between rubber and the other materials are known. They consist of solutions or dispersions of the most varied organic materials. Such known adhesive agents contain, for example, film-forming polymers, such as halogenation products of natural or synthetic rubbers. Post-brominated poly-2,3-dichlorobutadienes or also post-chlorinated poly-2,3-dichlorobutadienes or poly-2,3-dimethylbutadiene or chlorination or bromination products of nitrile rubbers, polybutadiene-styrene or rubber-like ethylenepropylene-terpolymerizates may also be used with good results.

Frequently, such adhesive agents contain also poly-C-nitroso compounds, such as dinitrosobenzene, p-dinitroso-diphenylamine, p-dinitroso-cymene, dinitroso-naphthalene, methoxy-dinitrosobenzene, chloro-dinitrosobenzene, cyclohexyldinitrosobenzene, such as are described in U.S. Pat. 3,258,388.

Further known adhesives for rubber and metal contain reactive synthestic resins, for example, epoxy resins, such as the reaction products of novolak with epichlorohydrin, or also phenolic resins or polysiloxane compounds containing unsaturated radicals. It is mostly advisable to add to such reactive synthetic resins so-called hardeners or crosslinking agents. For compounds containing epoxy groups, aliphatic or aromatic amines, acid amides with free amino groups, carboxylic acid anhydrides such as hexahydrophthalic anhydride or so-called Lewis acids or their complex compounds, e.g., the borontrifluoride complexes with amines or alkanols, can be used. Many of these adhesives for rubber and metal are described in U.S. Pat. No. 3,099,-632.

Also as adhesive for rubber and metal may be empolyed monomeric unsaturated silanes such as vinyltriethoxysilane or silanes containing amino groups such as diethoxysilane, or also mercaptosilanes. The latter are particularly suited as adhesives for silicone rubber. Many of these adhesives for rubber and metal are described in U.S. Pat. 3,022,196.

Particularly good results are obtained if the process according to the invention is carried out with adhesives for rubber and metal consisting of a mixture of post-brominated polydichlorobutadienes, of a mono- or poly-C-nitroso-compound, and, if necessary, of reactive phenolic resins such as are described in U.S. Pat. No. 3,258,389. Moreover, it is often appropriate to use such adhesives for rubber and metal which consist of chlorinated diene polymers, expoxidized novolak made of novolak by the reaction of epichlorohydrin under alkaline conditions and so-called hardeners for epoxy resins. Furthermore, with good results adhesives may be used, which consist of mixtures of chlorinated or hydrochlorinated dienic polymers, polychloroprene, copolymerizates of vinyl pyridine with butadiene and styrene, or also those which contain copolymers of conjugated dienes and esters of acrylic or methacrylic acid.

Organic hydrocarbons, chlorinated hydrocarbons or also ketones, esters, ethers or also alcohols may be used as solvents, or dispersing agents, respectively. Thus, for example, hexane, heptane, octane, toluene, benzene, xylene, methanol, ethanol, isopropanol, methylene chloride, carbon tetrachloride, dichloroethylene, chlorobenzene, dichlorobenzene, bromobenzene, acetone, methylethylketone, diethylketone, butyl acetate, amyl acetate, ethyl acetate, anisole and others may be used as solvents. Frequently, it is advisable to add to the solutions or the dispersions additional auxiliaries such as carbon blacks, aging inhibitors or pigments, dyes, etc.

The coating of the filament bodies is carried out in a known manner. Thus, the adhesive can be applied by means of immersion, rolling-on or spraying. As to spraying, particularly in the case of thicker filament bodies, the so-called vacuum or electrostatic spray guns are suited. However, it is also possible to make the coating application, particularly in the case of thinner cord-like objects, by means of nozzles, or by soaked soft felt mats. Even if the adhesives utilized contain pigments insoluble in the system, this coating application is well suited. Occasionally it may be appropriate to lead, especially wires, through a degreasing stage prior to the coating of the filament bodies.

In order to achieve the most homogenous coating, it is advantageous to repeat the coating and drying process continuously for several times, for example, 4 to 10 times. In this practice, the filament bodies can be conducted repeatedly through the same or through different coating baths and through the same drying apparatus. For instance, an adhesive primer may be first applied to the filament body which has special affinity to this material, and subsequently an adhesive coating which has a special affinity to the elastomer stock which is to be vulcanized may be applied with drying, according to the invention, between the coatings.

Sometimes, it is of advantage to provide coated wire prior to its winding with a thin layer of a lubricant. Suited for this purpose are, for example, such mineral oils, which are often components of the rubber stock mixtures which are to be vulcanized, and for this reason, are taken up by the rubber stock mixture during the vulcanization process and, therefore, do not cause a weakening of the bond between rubber and the substrate.

The invention procedure is of particular advantage for the coating of cold-drawn iron or steel wire. A pretreatment of the metallic surfaces by blasting or a chemical pre-treatment, such as pickling or phosphatizing, is in most cases unnecessary. Naturally, the invention process can also be applied to wires coated with brass, copper or galvanized in case such coatings are desired for other reasons than the improvement of the rubber adhesion, for example, for the achievement of additional protection against corrosion. Also in these cases an improvement of the adhesion is obtained, even if the rubber stock mixture has already a good adhesion to brass.

The invention process can also be applied to other metallic wires, such as to wires made of alloyed steel, nickel, chrome nickel, copper and the like. Moreover, it is suited for the coating of filament bodies made of glass fibers, such as fiber glass cords or of synthetic fibers, such as polyethyleneterephthalates or polyamides. The filament bodies may have a diameter of about 0.1 mm. to 25 mm., particularly between 0.15 mm. and 10 mm.

The coated filament bodies made according to this invention, particularly from cold-drawn steel wire or brass-plated or galvanized steel wire, or the strands, cords or ropes made from them, or glass-fiber fabric or cords, are suited for the reinforcement of rubber, particularly for the manufacture of tires or high pressure hoses or steel-cord reinforced conveyor belts or special cables.

Since, in general, adhesives for rubber and metal are heat-activated systems, it is customary to dry the adhesives after application either at room temperature or at a maximum temperature of approximately 90° C. in ambient air. In case heating to higher temperature cannot be avoided, for example while manufacturing rubber-metal-composite parts under the extrusion die method and employing vulcanization molds with various mold emplacements, the metal parts which had been coated with adhesives are exposed only shortly to elevated temperatures, which usually do not go beyond 150° to 170° C. Thus, it was surprising that according to the inventive process, adhesive layers are obtained which have not lost their activity. The method is particularly advantageous if several—if necessary different—coatings of adhesives are applied, whereby on the one hand a good adhesion to the metal is obtained, and on the other hand, a very high reactivity toward the elastomers which are to be vulcanized is achieved.

The following specific embodiments are illustrative of the practice of the invention without being limitative in any respect.

EXAMPLES

For the testing of the adhesion between the filament bodies and rubber, the following vulcanizable rubber stock mixtures were used.

| Butyl rubber mixture: | Grams |
|---|---|
| Butyl rubber | 100.0 |
| FEF—Carbon black | 60.0 |
| Zinc oxide | 25.0 |
| Paraffinic mineral oil | 5.0 |
| Dibenzoquinonedioxime | 6.0 |
| Lead dioxide | 10.0 |
| Sulfur | 2.0 |

Vulcanization conditions: Press 40 min./151° C.
Autoclave 100 min./4.7 atmospheres excess pressure steam.

Styrene-butadiene-rubber mixture: Grams
- Styrene-butadiene-rubber type 1500 _____ 100.0
- HAF—Carbon black _____ 45.0
- Zinc oxide _____ 5.0
- Stearic acid _____ 2.0
- High aromatic mineral oil _____ 8.0
- Pine tar _____ 3.0
- Paraffin wax _____ 0.75
- Phenyl-β-naphthylamine _____ 0.5
- N-phenyl-N'-isopropyl-phenylenediamine ___ 1.0
- N-cyclohexyl-2-benzothiazyl-sulfenamide ___ 1.25
- Diphenylguanidine _____ 0.15
- Sulfur _____ 1.75

Vulcanization conditions: Press 18 min./151° C.
Autoclave 50 min./4.7 atmospheres excess pressure steam.

Nitrile rubber mixture: Grams
- Nitrile rubber, cold polymerized, 38% acrylonitrile _____ 100.0
- Aromatic polyether _____ 10.0
- Zinc oxide, active _____ 2.0
- Mercaptobenzimidazole _____ 2.0
- α-Naphthylamine _____ 3.0
- Siliceous chalk (Gloxil) _____ 60.0
- Sulfur _____ 0.1
- SRF—Carbon black _____ 50.0
- Tetramethylthioramdisulfide _____ 2.5

Vulcanization conditions: Press 15 min./151° C.
Autoclave 50 min./4.7 atmospheres excess pressure steam.

Chloroprene rubber mixture I: Grams
- Chloroprene rubber _____ 100.0
- Magnesium oxide _____ 4.0
- Phenyl-β-naphthylamine _____ 2.0
- MT—Carbon black _____ 80.0
- Mixture of $C_{12}$–$C_{32}$-hydrocarbons _____ 1.0
- Naphthenic mineral oil _____ 5.0
- Tetramethyl-thiorammonosulfide _____ 0.5
- Di-o-tolyl-guanidine _____ 0.5
- 2-mercapto-imidazoline _____ 0.5
- Zinc oxide _____ 5.0
- Sulfur _____ 1.0

Vulcanization conditions: Press 40 min./151° C.
Autoclave 100 min./4.7 atmosphere excess pressure steam.

Chloroprene rubber mixture II: Grams
- Chloroprene rubber, S-modified _____ 33.0
- Chloroprene rubber _____ 67.0
- Styrene-butadiene resin _____ 15.0
- Magnesium oxide _____ 4.0
- Mixture of 65% phenyl-β-naphthylamine and 35% N,N'-phenyl-p-phenylenediamine _____ 2.0
- N,N'-disalisylidene-1,2-propylenediamine ___ 1.0
- Kaolin _____ 110.0
- REF—Carbon black _____ 20.0
- Microcrystalline paraffin wax _____ 4.0
- Naphthenic mineral oil _____ 15.0
- Zinc oxide _____ 5.0
- 2-mercapto-imidazoline _____ 1.0

Vulcanization condition: Press 40 min./151° C.
Autoclave 100 min./4.7 atmospheres excess pressure steam.

Natural rubber mixture: Grams
- Smoked sheet _____ 100.0
- Stearic acid _____ 1.0
- Zinc oxide _____ 3.0
- Pine tar _____ 2.0
- Phenyl-β-naphthylamine _____ 1.0
- FEF—Carbon black _____ 30.0
- Naphthenic mineral oil _____ 2.0
- Mercaptobenzothiazole _____ 0.8
- Sulfur _____ 2.8

Vulcanization conditions: Press 18 min./151° C.
Autoclave 50 min./4.7 atmospheres excess pressure steam.

EXAMPLE 1

Coating of brass-plated steel wire

Diameter 0.3 mm., tenacity 250–280 kp./mm.$^2$

"kp." is the abbreviation for "kilopond" which, in the CGS system is defined as the weight of a mass of one kilogram.

Comparison test

The wire was lead through an immersion bath which contained a rubber-metal adhesive prepared according to U.S. Pat. 3,258,388, Example 4, however, with addition of 2% phenolic resin, calculated on the total amount. In order to obtain a homogenous coat a maximal emersion speed of 0.2 m./min. was observed. After drying at room temperature the coated wire was lead a second time through another immersion bath, which also contained the adhesive prepared according to U.S. Pat. 3,258,388, Example 4, however without any addition, again with an emersion speed of 0.2 m./min. After again drying of the film at room temperature, the film hardness was measured by the pencil method. The hardness was HB. After bending the coated wire around a small radius the adhesive film cracked off.

Invention process

The same wire was continuously coated in a machine as it is used for the production of lacquered electric insulation wire. The machine was equipped with two coating stations in which the wire was coated thus, that it was pulled forth and back between two felt pads soaked with adhesives. Also the coating machine was equipped with two infrared drying zones of 2.5 m. length each provided with turning and guidance wheels so that the wire was guided a total of ten times through the coating and drying apparatus. The coating stations were arranged such that the coating was done five times with the first-named adhesive and five times with the second adhesive. The passing speed was 40 m./min. The heating zones were set to 320° air temperature. The drying time was 3.75 seconds after each single coating. Before the winding of the coated wire a thin film of naphthenic mineral oil was also applied as a lubricant. The applied adhesive film had a pencil hardness of over 6H and was very elastic. Even on bending the wire around a small radius the adhesive film remained firm on the wire.

For the examination of the rubber-metal adhesion two test methods were used:

(a) According to ASTM D–1871, method A, single wires were vulcanized into a rubber pad of 1 cm. thickness (embedding length 1 cm.) and subsequently the tearing strength measured in a tensile testing machine. On the torn-off wires, the percent of the adhesion area covered with rubber was estimated. 100R means a 100% covering with rubber and 50R a 50% of covering. For comparison an uncoated brass wire was used. The test results are shown in the following table; each adhesion value was ascertained in 16 single measurements.

TABLE I

| Rubber stock mixtures as given above | Coated brass wire Kp. | Coated brass wire Rubber adhesion, percent | Uncoated brass wire Kp. | Uncoated brass wire Rubber adhesion, percent |
|---|---|---|---|---|
| Styrene-butadiene rubber | 14 | 80R | 3 | 0R |
| Natural rubber | 17 | 95R | 4 | 20R |
| Chloroprene rubber II | 5 | 100R | 0 | 0R |
| Nitrile rubber | 13 | 95R | 0 | 0R |

(b) In addition to the tearing-off method, a peeling test was done. Following a procedure described by E. C. Taylor (Paper at the Rubber Division of the American Chemical Society in Miami Beach on May 5, 1965) the wire was closely packed on pipe sections of approximately 8 cm. diameter and subsequently coated with a rubber mixture. The rubber layer was bandaged as for the production of rubber coated rolls, vulcanized in superheated steam, ground off to approximately 6 mm., cut in 2.5 cm.-broad stripes and pulled off in a tensile-testing machine at an angle of 90° from the wire position. The following table gives the results.

TABLE II

| Rubber stock mixtures as given above | Coated brass wire | | Uncoated brass wire | |
|---|---|---|---|---|
| | Kp./inch | Rubber adhesion, percent | Kp./inch | Rubber adhesion, percent |
| Natural rubber | 26 | 100R | 19 | 30R |
| Styrene-butadiene rubber | 90 | 100R | 13 | 5R |
| Nitrile rubber | 59 | 100R | 5 | 0R |
| Chloroprene rubber | 30 | 100R | 10 | 0R |
| Butyl rubber | 31 | 100R | 11 | 7R |

EXAMPLE 2

Coating of wet-cold drawn steel wire

Diameter 0.3 mm., tenacity 180 kp./mm.$^2$.

Comparison test

The wire was lead successively with intermediate drying, through two immersion baths, as described in Example 1. In the first immersion bath as primer as adhesive according to U.S. Pat. 3,099,632, Example 1, was applied, in the second immersion bath an adhesive according to U.S. Pat. 3,258,388, Example 4. After drying at room temperature the film had a pencil hardness HB and cracked off when it was bent around a small radius.

Invention procedure

If the same adhesive system was applied continuously as in Example 1 whereby the coating was done five times with the primer and five times with the adhesive an adhesive film with the pencil hardness 6H and with a high elasticity of the coating was obtained. On bending around a small radius the coating did not crack off the wire.

For testing of the adhesion, the peeling test described in Example 1 was used.

TABLE III

| Rubber stock mixture as given above | Kp./inch | Rubber adhesion, percent |
|---|---|---|
| Styrene-butadiene rubber | 89 | 100R |
| Nitrile rubber | 75 | 100R |

EXAMPLE 3

Coating of a brass-plated steel cord

Construction 3 x 7 x 0.15.

Comparison test

The steel cord was lead successively, with intermediate drying through two immersion baths as described in Example 1. Again a pencil hardness of approximately HB was obtained. On bending of the steel cord, the coating cracked off.

Invention process

When the same adhesive system was applied continuously as in Example 1 whereby the drying temperature was 360° C., a coat with a pencil hardness of approximately 6H and of high elasticity was obtained. On bending of the steel cord no coating material cracked off from the cord.

For the testing of the adhesion again the peeling test was used as in Example 1.

TABLE IV

| Rubber stock mixtures as given above | Coated steel cord | | Uncoated steel cord | |
|---|---|---|---|---|
| | Kp./inch | Rubber adhesion, percent | Kp./inch | Rubber adhesion, percent |
| Styrene-butadiene rubber | 81 | 98R | 20 | 0R |
| Natural rubber | 30 | 100R | 26 | 40R |
| Nitrile rubber | 60 | 100R | 14 | 0R |

EXAMPLE 4

Coating of a galvanized steel cable

Diameter 4.17 mm., breaking load 1250 kp.

The steel cable was cleaned before the coating with a cloth soaked with trichloroethylene. Several of the cable ends lying next to each other at a distance of 3 cm. each were coated with the aid of an electrostatic spray gun with an adhesive according to U.S. Pat. 3,099,632, Example 1, with an addition of 1.5% phenolic resin. For this purpose the adhesive was diluted with 0.34 kg. xylol and 0.02 kg. trichloroethylene per 1 kg. adhesive. In a one-sided coating procedure a thin all around homogenous coating was obtained.

(a) After drying the adhesive at room temperature a relatively soft film was obtained which cracked off on bending the cable.

(b) At a drying for 12 minutes at 150° C. in ambient air an essentially harder film was obtained which, however, cracked off again on bending the cable.

(c) At an infrared drying for 1 minute at 350° C. a hard and elastic film was obtained which on bending the cable did not separate from the base.

For testing of the adhesion a chloroprene rubber stock mixture I was vulcanized following ASTM D-1871, method A. For this purpose cable ends treated as in (c) above were vulcanized in a 10 cm.-thick rubber pad and subsequently torn off on a tensile-test machine. A strength of 870 kp. per 10 cm. embedding length was found. The cable was completely covered with rubber.

EXAMPLE 5

Coating of a stainless-steel wire

Diameter 0.24 m., tenacity 60 kp./mm$^2$.

Comparison test

The wire was lead successively, with intermediate drying, through two immersion baths, as described in Example 1. In the first immersion bath as primer an adhesive was used according to U.S. Pat. 3,258,388, Example 4, however with addition of 1% hexahydrophthalic acid anhydride. In the second immersion bath the same adhesive was used, however without the addition of hexahydrophthalic acid anhydride. After drying at room temperature the film had a pencil hardness HB and cracked off when it was bent around a small radius.

Inventive procedure

If the same adhesion system was applied continuously as in Example 1, whereby the coating was done five times with the primer and five times with the adhesive, a very elastic adhesive film of a pencil hardness 6H was obtained which did not crack off on bending around a small radius. For the testing of the adhesion of the peeling test described in Example 1 was again used.

TABLE V

| Rubber stock mixture as given above | Kp./inch | Rubber adhesion, percent |
|---|---|---|
| Natural rubber | 36 | 75R |
| Chloroprene rubber I | 36 | 100R |

EXAMPLE 6

Coating of fiberglas cord

A fiber glass cord was coated without cleaning according to the continuous coating process described in Example 1. As primer was used (A) an adhesive according to U.S. Pat. 3,099,632, Example 1, with the addition of 2% phenolic resin, combined with the adhesive according to U.S. Pat. 3,258,388, Example 4, for another test (B) as primer was used an adhesive according to U.S. Pat. 3,022,196, Example 2, combined with an adhesive according to U.S. Pat. 3,258,388, Example 4. The speed of passing through was 40 m./min., the drying time 7.5 seconds at 250.° C. per coating process. In both cases elastic films were obtained which adhered strongly to the base.

For testing of the adhesion the coated and uncoated ends of fiber glass cord were vulcanized according to ASTM D-1871, method A, into 1-cm. thick rubber blocks. The tearing strength was measured on a tensile-testing machine.

TABLE VI

| Rubber stock mixture as given above | Coated cord (A) | | Coated cord (B) | | Uncoated cord | |
|---|---|---|---|---|---|---|
| | Kp./in. | Rubber adhesion, percent | Kp./in. | Rubber adhesion, percent | Kp./in. | Rubber adhesion, percent |
| Styrene-butadiene mixture | 7.7 | B | 9.6 | B | 1.8 | OR |
| Natural rubber | 7.1 | B | 9.0 | B | 2.0 | OR |

The adhesion values were ascertained from 30 single values (B=breakage of the fiber glass cord). In addition, the adhesion was examined by the peeling test in Table VII.

TABLE VII

| Rubber Stock Mixture as given above | Coated cord (A) | | Uncoated cord | |
|---|---|---|---|---|
| | Kp./inch | Rubber adhesion, percent | Kp./inch | Rubber adhesion, percent |
| Natural rubber | 18 | 10R | 2 | OR |
| Styrene-butadiene rubber | 21 | 30R | 6.5 | OR |

The preceding specific embodiments are illustrative of the practice of the invention. It is to be understood, however, that other expedients known to those skilled in the art may be employed without departing from the spirit of the invention or the scope of the appended claims.

I claim:

1. A process for the coating of inorganic filament bodies with organic adhesives for metal and rubber which consists essentially of the steps of applying a coating of a heat-activated organic adhesive for metal and rubber selected from the group consisting of halogenated, film-forming polymers of natural and synthetic rubbers, alone and in admixture with poly-C-nitroso compounds, epoxy resins and epoxy resin hardeners, monomeric unsaturated silanes, amino-containing silanes, mercaptosilanes, and mixtures thereof, in dissolved or dispersed form in an organic solvent to an inorganic filament body selected from the group consisting of iron, steel, brass-coated steel copper-coated steel, galvanized steel, nickel, chrome nickel, copper and glass fibers, said filament body being in the form selected from the group consisting of wires, strands, cords, ropes and cables and having a diameter of from about 0.1 mm. to 25 mm., passing said coated inorganic filament body through a heated zone having a temperature of from 225° C. to 500° C. for a period of from 1 to 60 seconds, whereby said adhesive coating is increased in elasticity and retains only a portion of its heat activity but which is sufficient to remain reactive to vulcanizable elastomers, and recovering said coated inorganic filament body adapted to bond to vulcanizable elastomer stock mixtures under vulcanizing conditions.

2. The process of claim 1 wherein said coated filament body is passed through said heated zone having a temperature of from 250° C. to 400° C. for a period of from 2 to 20 seconds.

3. The process of claim 1 wherein more than one application of said coating of an organic adhesive for metal and rubber is made and said coated filament body is passed through said heated zone after each application.

4. The process of claim 3 wherein four to ten applications of said coating are made.

5. The process of claim 1 wherein said filament body is of steel and has a diameter of from about 0.15 mm. to 10 mm.

6. The process of claim 1 wherein said organic adhesive for rubber and metal is selected from the group consisting of (1) a mixture of postbrominated polydichlorobutadiene, a poly-C-nitroso compound and chlorinated natural rubber and (2) a mixture of (1) with a reactive phenolic resin.

7. The process of claim 1 wherein said organic adhesive for rubber and metal is a mixture of a chlorinated dienic polymer, an epoxidized novolak and an epoxide resin hardener.

8. The process of claim 1 wherein said organic adhesive for rubber and metal is a mixture of chlorinated or hydrochlorinated dienic polymers, polychloroprene and a copolymerizate selected from the group consisting of copolymerizates of vinylpyridine with butadiene and styrene and copolymerizates of conjugated dienes and alkanol esters of acrylic or methacrylic acids.

References Cited

UNITED STATES PATENTS

| | | | |
|---|---|---|---|
| 2,333,922 | 11/1943 | Foster | 117—75 X |
| 2,500,523 | 3/1950 | Crosby et al. | 117—128.4 UX |
| 2,619,445 | 11/1952 | Kalafus | 117—75 UX |
| 2,812,741 | 11/1957 | O'Connor | 117—128.4 X |
| 2,968,587 | 1/1961 | Baldwin et al. | 156—333 X |
| 3,022,196 | 2/1962 | Jenkins et al. | 117—127 X |
| 3,099,632 | 7/1963 | De Crease | 260—38 X |
| 3,239,598 | 3/1966 | Olson et al. | 117—75 UX |
| 3,250,641 | 5/1966 | Kersker et al. | 117—119.6 X |
| 3,258,388 | 6/1966 | Coleman, Jr. et al. | 156—333 X |
| 3,405,754 | 10/1968 | Georges et al. | 117—128.4 UX |

ALFRED L. LEAVITT, Primary Examiner

T. E. BOKAN, Assistant Examiner

U.S. Cl. X.R.

117—72, 75, 77, 79, 126 GE, 126 GN, 126 GQ, 126 GR 126 GS, 128.4, 128.7; 156—333